Oct. 10, 1939.     H. PAXTON     2,175,482
NAIL FEEDING MECHANISM
Filed Feb. 1, 1937     2 Sheets-Sheet 1

HALE PAXTON
INVENTOR.

BY

ATTORNEY.

Oct. 10, 1939.  H. PAXTON  2,175,482
NAIL FEEDING MECHANISM
Filed Feb. 1, 1937   2 Sheets-Sheet 2

HALE PAXTON
INVENTOR.
ATTORNEY.

Patented Oct. 10, 1939

2,175,482

UNITED STATES PATENT OFFICE 2,175,482

NAIL FEEDING MECHANISM

Hale Paxton, Santa Ana, Calif., assignor to Food Machinery Corporation, San Jose, Calif., a corporation of Delaware Application February 1, 1937, Serial No. 123,409

11 Claims. (Cl. 1—16)

This invention relates to nail handling apparatus and is particularly useful in the feeding of nails to a nailing machine.

In nailing machines the driving of nails into the work is generally accomplished in a certain sequence in accordance with the requirements of the work.

It is an object of this invention to provide a means for feeding nails intermittently to certain chucks of a nailing machine in accordance with the requirements of that portion of the work served by these chucks.

One of the methods long in use for manufacturing boxes in a box making machine has been to provide therein means for supporting the box ends, and a center partition if required, and to rotate these ends and partition 90° after each of three successive nailing operations during which two sides and bottom of the box are nailed onto the ends and the partition. In the making of lemon boxes by this method, for instance, by a full automatic machine such as shown in U. S. Letters Patent No. 1,844,333 issued to E. C. Northrup on February 9, 1932, a battery of seven nail chucks are provided in the nailing mechanism over each of the box ends and the center partition. As the sides of a lemon box are narrower than the bottom and therefore require only six nails whereas the bottom requires seven nails, it is desired that only six of the seven chucks in each of these batteries be supplied with nails when a side of the box is being nailed thereon but that all seven chucks be provided with nails when the bottom of the box is being nailed on so that seven nails will be driven through the bottom of the box into each of the box ends and into the center partition. While many different devices have been designed for the intermittent feeding of nails to the seven chucks in these batteries so that these seven chucks will be supplied with nails only during the nailing of the bottom on the box, these devices have all been relatively complex in construction and operation and correspondingly subject to disorder.

It is an object of this invention to provide a relatively simple and positive mechanism for feeding nails to nail chucks in a box making machine only during certain of a series of nailing operations.

The manner of accomplishing the foregoing objects as well as further objects and advantages will be made manifest in the following description taken in connection with the accompanying drawings, in which.

Figure 1:
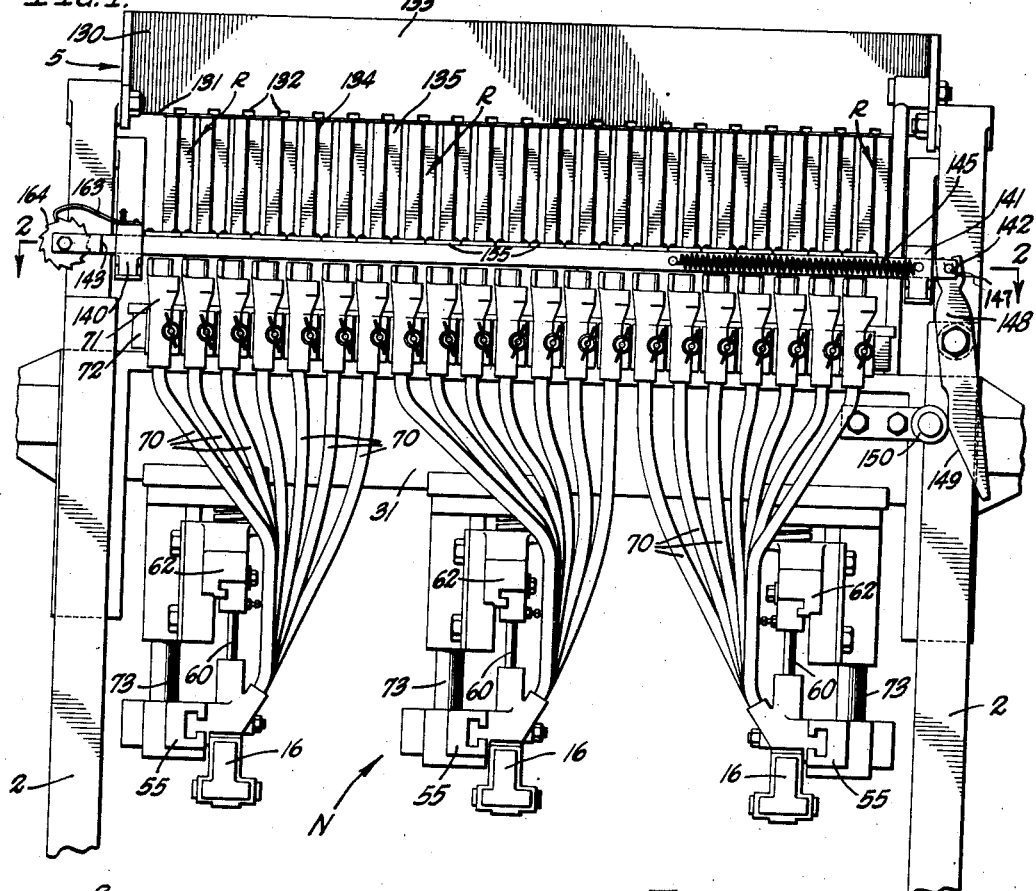
Fig. 1 is a fragmentary front elevational view of a box nailing machine as shown in the aforementioned patent, this view illustrating a preferred embodiment of the invention incorporated with said machine.

Wherever possible the elements shown in the drawings that belong to the prior art will be identified by the same reference characters as indicate these elements in the specification of the Northrup patent aforementioned. It is thus to be noted that the nailing machine N includes a frame 2. Slidable vertically on this frame is a nail driver cross head 31 carrying three brackets 62, from each of which extends downwardly seven nail drivers 60. Slidable vertically in suitable bearings provided on the cross head 31 are shafts 73 upon the lower ends of which are mounted brackets 55, these brackets carrying three batteries of nail chucks 16 seven chucks in each battery. Each of these chucks is disposed in vertical alignment with and slidably receives one of the nail drivers 60. The upper ends of the vertical slide shafts 73 are provided with a cup supporting bar 72 on which are supported twenty-one nail cups 71 which are connected by the usual nail pipes 70 to the chucks 16.

As shown in the aforesaid patent, a suitable means is provided for positioning the box ends and center partition beneath the batteries of chucks 16, for feeding side and bottom slats onto these ends and partition for lowering the cross head 31 and all the structure mounted with the chucks 16 on the vertical shafts 73 so that the chucks are brought to rest on the work and the cross head 31 then continues down to push the nail drivers 60 entirely into the chucks 16 and drive the nails from these chucks into the work. At the conclusion of each such nailing operation the cross head 31 and chuck means are lifted from the work and the latter rotated 90° as already mentioned preparatory to the performing of the next nailing operation thereon.

Between successive nailing operations nails are fed into the cups 71 and these gravitate immediately down the tubes 70 into chucks 16. Mounted on the upper end of the frame 2 for the purpose of supplying these nails to nail cups 71 is an automatic nail feeding and selecting apparatus 5. This apparatus includes the preferred embodiment of the present invention illustrated in the drawings, and comprises a nail hopper 130 which is pivoted on the frame 2 adjacent its forward lower edge 131 and rocks about said edge to feed nails through a series of openings 132 in the forward wall 133 of said hopper. The nails thus fed slide downwardly in vertical slots 134 provided centrally in a series of nail runs 135, one of which is provided for each of the cups 71 and terminated at its lower end just to one side of the center of this cup.

Slidable in bearings 140 and 141 (Fig. 2) on the frame 2 is a master pick bar 142 having a stop shoulder 143 which tends to be held against the bearing 140 by a contractile spring 145. Provided on the right-hand end of the bar 142 is a cap screw 147 which rides in a vertical notch (Fig. 1) in the upper end of a cam lever 148, the latter having a cam face 149 on its lower end. Provided on the cross head 31 is a cam roller 150 which engages the cam face 149 of the lever 148 each time the cross head 31 rises following the completion of a nailing operation so as to swing the lever 148 and tip master bar 142 towards the left to separate the shoulder 143 from the bearing 140 as shown in Figs. 1 and 2.

Figure 4:
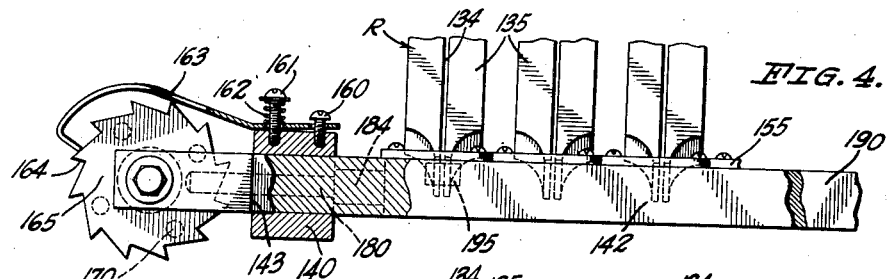
Fig. 4 is an enlarged fragmentary detail view illustrating the master bar of my invention as it is disposed during a nailing operation of the nailing machine.
Figure 5:
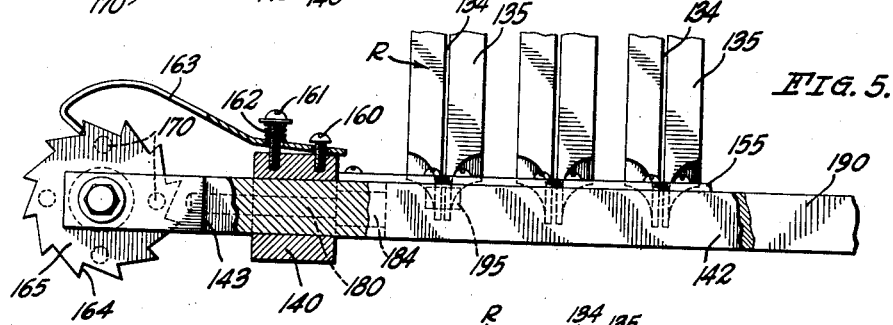
Fig. 5 is a view similar to Fig. 4 showing the master bar in a position as during the interval between nailing operations.
Figure 6:
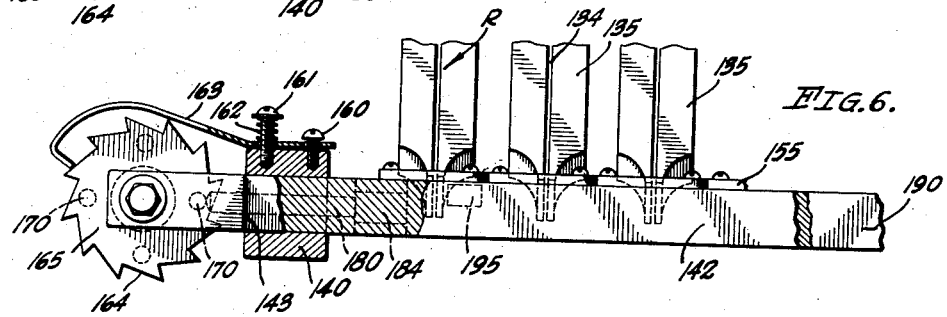
Fig. 6 is a view similar to Fig. 4 but illustrating the gate control bar of the invention in gate opening position.
Figure 7:
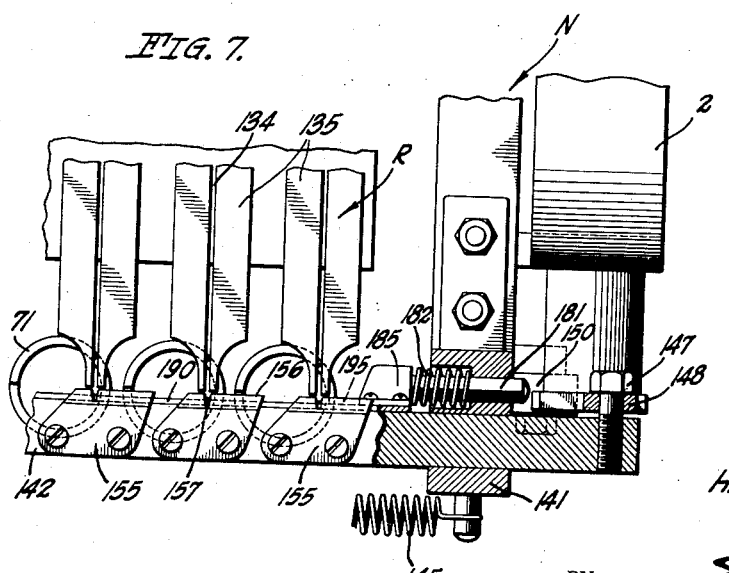
Fig. 7 is an enlarged fragmentary plan view of the right-hand portion of Fig. 2 with the gate bar shown in gate opening position.

Secured on the upper face of the bar 142 is a series of nail picks 155, each of these nail picks having a straight edge 156 which is broken in a left-hand portion thereof by a nail picking notch 157, the edge 156 being parallel with the bar 142 and disposed very close to the mouth of the guide slot 134 of one of the nail runs 135. When the bar 142 is in its rightward position as shown in Figs. 4, 6 and 7 the notches 157 are in correct alignment with the guideways 134 and allow sufficient room for a nail to be fed from the ends of these guideways into the notches 157. When the bar 142 is in its leftwardmost position as shown in Figs. 1, 2 and 5, the unbroken portions of the edges 156 of the nail picks 155 are disposed opposite the lower ends of the nail guideways 134 so as to prevent the feeding of any nails from these guideways while at the same time the notches 157 have been moved to the leftward, as shown in Fig. 2, so that any nails which have been previously fed into these notches while the latter were opposite the guideways 134 are now discharged downwardly by gravity into the cups 71 disposed therebeneath.

Secured loosely in place on the top of the slide bearing 140 by two screws 160 and 161 and a spring 162 coiled about the latter is a yieldable pawl 163. This pawl is adapted to engage teeth 164 of a ratchet wheel 165 which is rotatably mounted on the end of the bar 142 beyond the shoulder 143 so as to rotate under a degree of friction which prevents its being turned accidentally. Extending rearwardly from the ratchet wheel 165 is a series of pins 170, these being equally spaced about the wheel and of a number one third as great as the number of ratchet teeth 164. During each reciprocation of the bar 142 the dog 153 engages one of the teeth 164 and rotates the wheel 165 one-twelfth of a revolution or the circumferential distance of one tooth. At the completion of every third one of these partial revolutions of the wheel 165, one of the pins 170 is placed so that it lies on the right-hand side of the wheel 165 and in the same horizontal plane with the axis of the latter and remains in this position as the bar 142 returns its rightward position.

Figure 2:
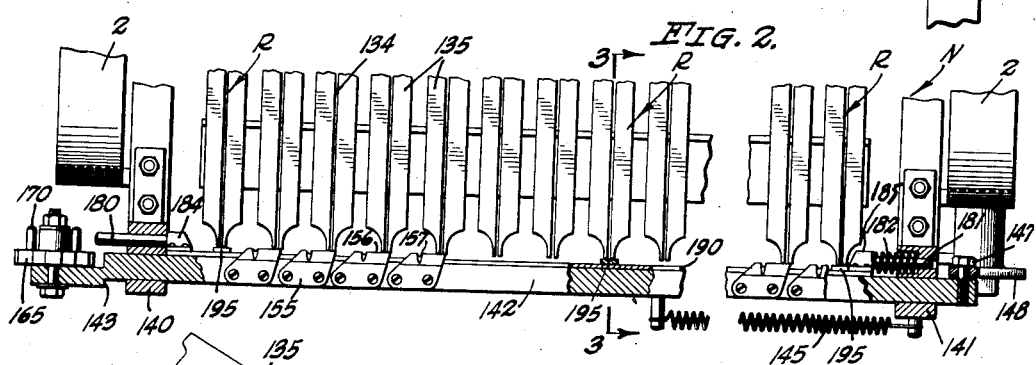
Fig. 2 is a fragmentary enlarged plan view taken on the line 2—2 of Fig. 1 with certain portions thereof broken away to illustrate the construction of the invention.
Figure 3:
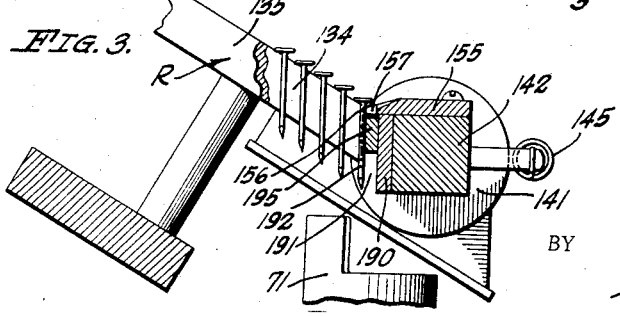
Fig. 3 is an enlarged cross sectional view taken on the line 3—3 of Fig. 2 and illustrating one of the gates of my invention in position for blocking the feeding of nails.

As shown in Figs. 2 and 7, the bearings 140 and 141 have horizontal bores for receiving slide pins 180 and 181, the bore for the latter being counterbored to receive a compression spring 182 disposed about the pin 181. These pins 180 and 181 have brackets 184 and 185 at their inner ends which are fixed to opposite ends of a gate supporting bar 190 which is relatively flat and lies against the rear face of the master pick bar 142. As shown in Fig. 3, the rear face of the gate mounting bar 190 is disposed just forwardly of the deepest portions of the nail picking notches 157. There is thus a free space 191 between the rear face of the bar 190 and the lower end of each of the nail runs 135 which permits the lowermost nail 192 of a column of these in that nail run to feed downwardly into the notch 157 disposed opposite the guideway 134 of this nail run whenever the space 191 is unobstructed.

As shown in Fig. 1, the nail runs 135 and the cups 140 into which nails are delivered from these nail runs are divided into three groups of seven each, each of these groups delivering nails to the chucks mounted on one of the brackets 55. One of the nail runs 135 of each of these groups of seven supplies nails for the forwardmost chuck 16 on the bracket 55 disposed therebeneath. These three nail runs will hereinafter be referred to specifically as nail runs R.

Welded onto the rear face of the gate supporting bar 190 are three nail gates 195, each of these being disposed in one of the free spaces 191 opposite one of the nail runs R when the bar 190 is disposed in its leftward position as shown in Figs. 2, 3, 4 and 5.

*Operation*

As already pointed out, the machine N operates to assemble boxes by automatically repeating a series of three nailing operations, in the first of which one side is nailed onto the box, in the second of which the bottom is nailed onto the box and in the third of which the other side is nailed onto the box. Each of these nailing operations is effected by a reciprocatory downward and upward movement of the cross head 31 and the parts assembled thereon, each of these movements beginning and ending with said cross head and its assembled parts positioned as shown in Fig. 1. During the rising of the cross bar 31 in each of these nailing operations the roller 150 engages the lever 148 and shifts the master pick bar 142 to its leftward position as shown in this figure where it remains during the intervals between successive nailing operations and when the machine is at rest. When the cross head 31 moves downwardly in initiating each nailing operation the lever 148 is released from restraint by the roller 150 so that the spring 145 pulls the bar 142 into its rightward position in which it is shown in Figs. 4, 6 and 7.

The gate supporting bar 190 remains in the position in which it is shown in Figs. 2, 3, 4 and 5 excepting when it is shifted to the right by the engagement of one of the pins 170 with the pin 180 during a return of the bar 142 from the leftward position of the latter to its rightward position. Such an engagement takes place during the downward movement of the nailing cross head 31 incidental to each third nailing operation carried on in the machine N. This intermittent character of the actuation of the control supporting bar 190 results from the fact that the bar 142 must be reciprocated from its rightward to its leftward position three times to cause the rotation of the ratchet wheel 165 one quarter of a revolution so as to bring one of the pins 170 into position at the right side of this ratchet wheel and lying in the plane of the axis of the wheel. The arrival of a pin 170 in this position is illustrated in Fig. 5 where it is seen that this takes place as the bar 142 is shifted into its leftward position during the third of a series of three reciprocations following the last previous reciprocation in which another of the pins 170 had been placed in a similar position. When a pin 170 is thus disposed it is in alignment with the pin 180 and will shift the bar 190 to the right as shown in Figs. 6 and 7 when the bar 142 returns to the right. This results in the gates 195 being shifted out of the spaces 191 opposite the lower ends of the nail runs R so that immediately upon the arrival of the notches 157 of the picks 155 in alignment with the guideways 134 of the nail runs R, the foremost nails in these runways will be delivered into these notches and upon the left ward movement of the master bar 142, which immediately follows, the nails thus fed into the notches 157 last above mentioned will be delivered through the respective cups 71 and tubes 70 therebelow to the three forwardmost nail chucks 16 in the machine. As the nails driven from the chucks 16 during a given nailing operation are always fed to these chucks during the last preceding nailing operation, the ratchet wheel 165 is set so as to cause a feeding of nails as just described hereinabove to the foremost of the nail chucks 16 during the nailing operation which applies the first of the sides to the box. All of the seven chucks in each of the three banks thereof are thus supplied with nails during the nailing of the bottom onto the box so that the bottom is secured to each of the box ends and the middle partition by seven nails instead of six as is the case with both sides.

With the return of the master pick bar 142 to its leftward position in the accomplishing of the feeding of nails from all of the nail runs 135 to all of the chucks 16, the pressure of the pin 170 against the pin 180 is released permitting the bar 190 to be returned by the spring 182 to its leftwardmost position in which the gates 195 again block the delivery of nails from the nail runs R and in which positions these gates remain during the two nailing operations immediately following. As the shifting of the gate supporting bar 190 to the rightward is effected by the rightward movement of the master pick bar 142 which is in turn caused by the spring 145, it is clear that the latter spring is considerably stronger than the spring 182 on the gate supporting bar pin 181 which must be overcome in order to move the bar 190 to the right.

While I have shown and described my invention as applied to the particular purpose of controlling the feeding of nails intermittently to the various chucks of an automatic box nailing machine, it is to be understood that the invention has a much broader application and may be used for numerous other purposes in the intermittent feeding of nails or other similar elements.

What I claim is:
1. In a nail feeding mechanism, the combination of: a plurality of nail runs; a plurality of nail picks, each of which is for picking nails one at a time from one of said nail runs; unitary means for actuating said nail picks simultaneously at recurrent intervals to pick nails from said runs; means continually positioned in blocking relation with the foremost nail in certain of said nail runs and thereby preventing the delivery of said foremost nails so blocked to those nail picks provided for picking said foremost nails; and means operative to remove said blocking means from blocking position just prior to a nail picking operation and return said blocking means to blocking position immediately following said nail picking operation, said blocking means remaining in blocking position except when thus temporarily removed therefrom as aforesaid.

2. In a nail feeding mechanism, the combination of: a plurality of nail runs, the delivery mouths of which lie in a given line; nail pick means which lies parallel to said line and which is adapted when shifted axially to pick the foremost nail from each of said runs; block means lying parallel with said line and adapted to be shifted axially to move into and from a blocking position in which said block means prevents the delivery of certain of said foremost nails to said nail pick means; and means for co-ordinately actuating said nail pick means and said block means to cause said blocking action to reoccur at predetermined intervals in a series of operations of said nail pick means.

3. In a nail feeding mechanism, the combination of: a plurality of nail runs, the delivery mouths of which are disposed along a given line; a nail pick bar mounted close to and parallel with said line and shiftable axially; nail picks on said bar which are adapted to pick the foremost nail from each of said run-ways when said bar is shifted axially as aforesaid; a block bar disposed adjacent said line and parallel thereto and mounted so as to be shiftable axially; block means on said block bar adapted to be shifted into and from blocking position by the shifting of said block bar, said block means when in blocking position preventing the delivery of certain of the foremost nails of said nail runs to the nail picks provided for receiving these; and means for co-ordinately shifting said nail pick bar and said block bar axially to perform a series of nail picking operations in which said blocking action reoccurs at predetermined intervals.

4. In a nail feeding mechanism, the combination of: a plurality of nail runs; a plurality of nail picks, each of which is for picking nails one at a time from one of said nail runs; block means for preventing the delivery of nails from certain of said nail runs to their respective picks when the latter are actuated to receive such nails; and a member extending across said nail runs adjacent the discharge ends of said nail runs, said block means being mounted on said member and controlled by the latter to render said block means operative as aforesaid during certain of a series of actuations of said nail picks.

5. A combination as in claim 4, in which said block means are substantially integral with said member and partake of the movement of the latter in order to effect control through said member of said block means.

6. In a nail feeding mechanism, the combination of: a plurality of nail runs; a plurality of nail picks, each of which is for picking nails one at a time from one of said nail runs; a nail pick bar on which said nail picks are mounted and adapted to be actuated by axial movement of said bar; and means lying substantially between said bar and the discharge ends of said nail runs and parallel with said bar and operative co-ordinately with said bar to prevent the delivery of nails from certain of said nail runs to their respective picks when the latter are actuated to receive such nails.

7. A combination as in claim 6, in which said delivery prevention means is actuated by being shifted in a direction parallel with the axis of said bar.

8. A combination as in claim 6, in which said delivery prevention means is actuated by being shifted in a direction parallel with the axis of said bar and in which means is provided for actuating said delivery prevention means from said bar.

9. In a nail feeding mechanism, the combination of: a plurality of nail runs with the discharge mouths thereof disposed along a given line; a picker bar disposed parallel with said line in front of said mouths, said bar being slidable longitudinally; a plurality of nail picks provided on said bar for picking nails one at a time from each of said nail runs; means for recurrently reciprocating said bar to effect said nail picking operation; a member disposed adjacent to said bar and slidable longitudinally between blocking and non-blocking positions; blocks provided on said member and adapted when the latter is in blocking position to prevent the discharge of certain of the foremost nails in said nail runs by the nail picks positioned to receive said nails; and a mechanism operable by said reciprocations of said bar to actuate and shift said member longitudinally into its non-blocking position as aforesaid, said shifting taking place during certain of the reciprocations of said bar and not during others.

10. A combination as in claim 9, in which said member lies against and slides upon said bar.

11. A combination as in claim 9, in which said member lies against and slides against said bar and is disposed between said bar and the aforesaid mouths of said nail runs.

HALE PAXTON.